United States Patent [19]

Theofanous

[11] Patent Number: 4,606,107

[45] Date of Patent: Aug. 19, 1986

[54] AUTOMOBILE CYLINDER HEAD REMOVAL TOOL

[76] Inventor: Theos E. Theofanous, 4747 Kester Rd., Winston-Salem, N.C. 27103

[21] Appl. No.: 738,341

[22] Filed: May 28, 1985

[51] Int. Cl.[4] .............................................. B23P 19/04

[52] U.S. Cl. ....................................................... 29/256

[58] Field of Search .................. 29/256, 263, 264, 266

[56] References Cited

U.S. PATENT DOCUMENTS

| | | | |
|---|---|---|---|
| 2,618,052 | 11/1952 | Skaggs | 29/256 |
| 2,684,527 | 7/1954 | Hedlund | 29/266 X |
| 3,060,558 | 10/1962 | Levenson | 29/256 |
| 4,437,220 | 3/1984 | Gregory | 29/256 X |

*Primary Examiner*—Frederick R. Schmidt
*Assistant Examiner*—Steven P. Schad
*Attorney, Agent, or Firm*—B. B. Olive

[57] ABSTRACT

A cylinder head removal tool is provided for removing the cylinder head from the engine block of an engine of the type used in a Fiat Model 128, 1300, 1500, or X-1.9. The tool comprises an elongated bar made of tool steel with means for bolting the bar to the cylinder head and for mounting pusher bolts which can be tightened down onto exposed threaded ends of frozen studs holding the cylinder head. As the bolts are tightened down onto the studs the cylinder head is gradually lifted upward free from the studs.

1 Claim, 6 Drawing Figures

FIG. 2
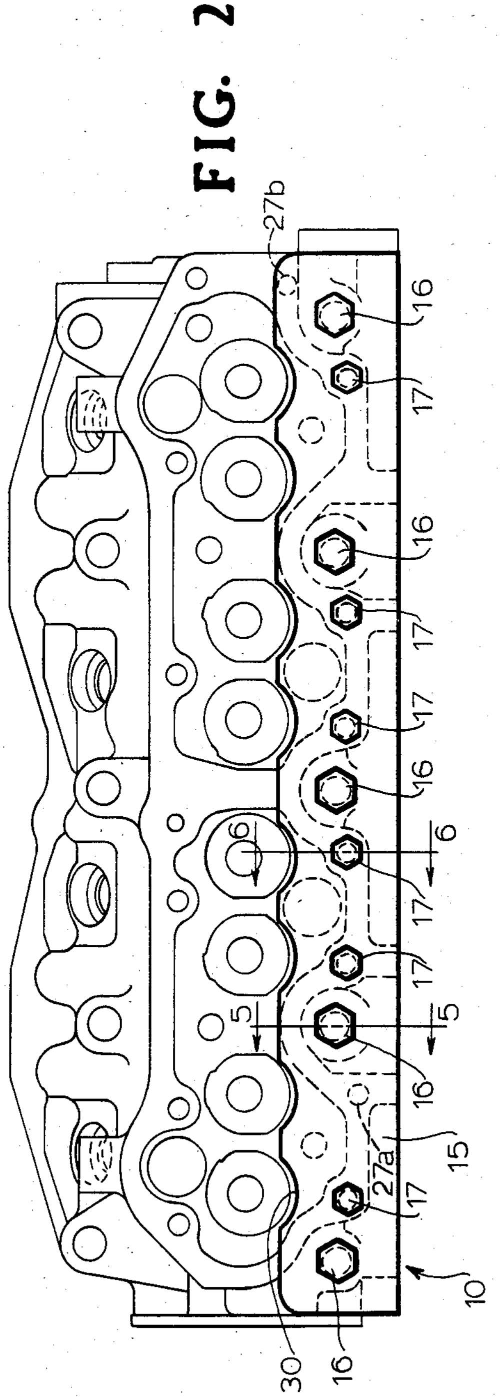
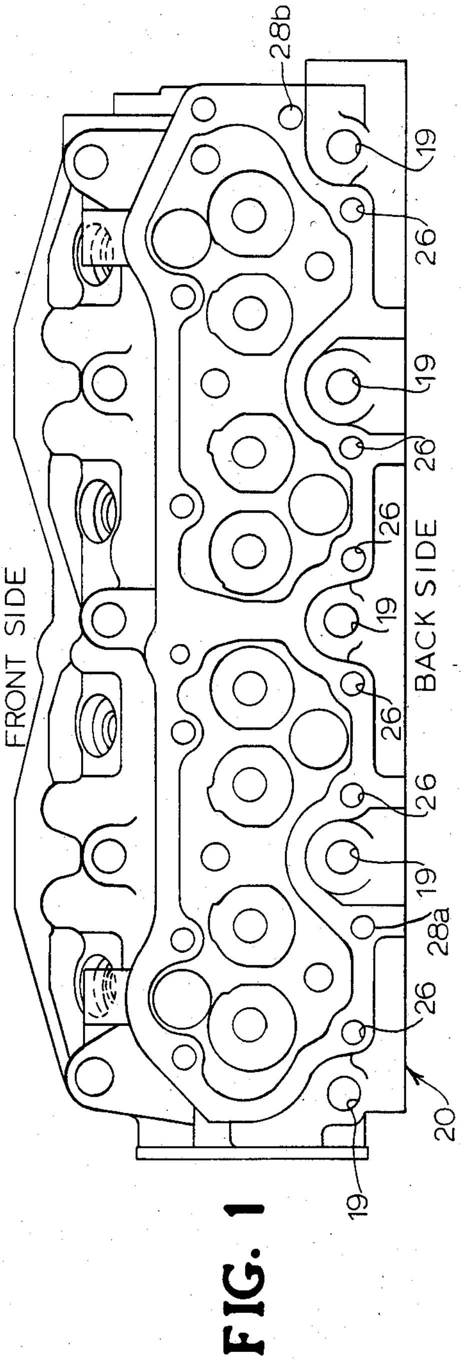
FIG. 1

AUTOMOBILE CYLINDER HEAD REMOVAL TOOL

DESCRIPTION

1. Technical Field

The present invention relates to an automotive engine cylinder head removal tool. More specifically, the head removal tool of the invention is adapted for removal of the cylinder head of an engine such as used in the Fiat Models 128, 1300, 1500, or X-1.9 overhead cam engines with the studs on only one side of the engine block.

2. Background Art

Applicant has found that during the engine rebuilding procedure for four cylinder, single overhead cam Fiat 128, 1300, 1500, and X-1.9 overhead cam engines with the studs on only one side of the engine block, extreme difficulty is encountered in removing the engine cylinder head. Five bolts secure the cylinder head to the cylinder block on the front or carburetor side of the engine and five nuts on threaded studs secure the cylinder head to the cylinder block on the back or manifold side of the engine. The front head bolts are normally easy to remove since there is little or no corrosion and they are easy to reach. However, it is normally very difficult to remove the cylinder head from the shanks of the studs along the back side of the engine after the nuts have been removed from the upper ends of the studs. Sometimes one or all of the studs are frozen in the cylinder head which prevents removal of the head. The cylinder head is typically made of aluminum whereas the studs are typically made of steel. Corrosion between the steel studs and the aluminum cylinder head is caused by seepage of water about the studs. By being "frozen" is meant that the studs are effectively stuck in place and cannot be easily separated from the head. Attempts to forcefully remove the cylinder head from the engine block are very time consuming and it is often virtually impossible to remove the cylinder head from the engine block. Thus, there is a need for a tool to assist in this cylinder head removal operation and applicant is unaware of any tool of any kind adapted to this purpose.

DISCLOSURE OF INVENTION

The automobile cylinder head removal tool of the invention comprises an elongated metal bar of predetermined thickness and width and of a length which is roughly equal to the length of the cylinder head. The bar tool has a flat, smooth bottom surface and a first series of angled holes which are located so that they can be aligned with a series of angled holes in the cylinder head normally used for fastening the camshaft housing on the cylinder head. A second series of vertical threaded holes are provided in the bar tool which can be aligned with the studs used to hold the cylinder head on the engine block. Before the bar tool of the invention is used, the camshaft housing is removed from the cylinder head. Additionally, the bolts which secure the cylinder head on the front side of the engine are also removed and the nuts on the upper ends of the studs which secure the cylinder head to the engine block on the back side of the engine are also removed. The bar tool of the invention is then mounted on the cylinder head to be removed and threaded bolts are mounted in the first series of holes and secured to the camshaft housing mounting holes on the cylinder head so as to secure the bar tool to the cylinder head. Next, another set of threaded bolts are threaded into the second series of holes and are tightened in a selected pattern so that the cylinder head is gradually forced upward and away from any studs to which the cylinder head might have been frozen. Once any frozen studs have been broken away from the cylinder head, the entire cylinder head may then be raised from the engine block.

DESCRIPTION OF THE DRAWINGS

FIG. 1 is a top plan view of the cylinder head of a Fiat engine of the type with which the present invention bar tool is designed to be used and illustrated after the camshaft housing has been removed.

FIG. 2 is a top plan view, similar to that of FIG. 1 but with the head removal bar tool of the invention in place on the cylinder head.

BEST MODE FOR CARRYING OUT THE INVENTION

Figures 3, 4, 5, 6:
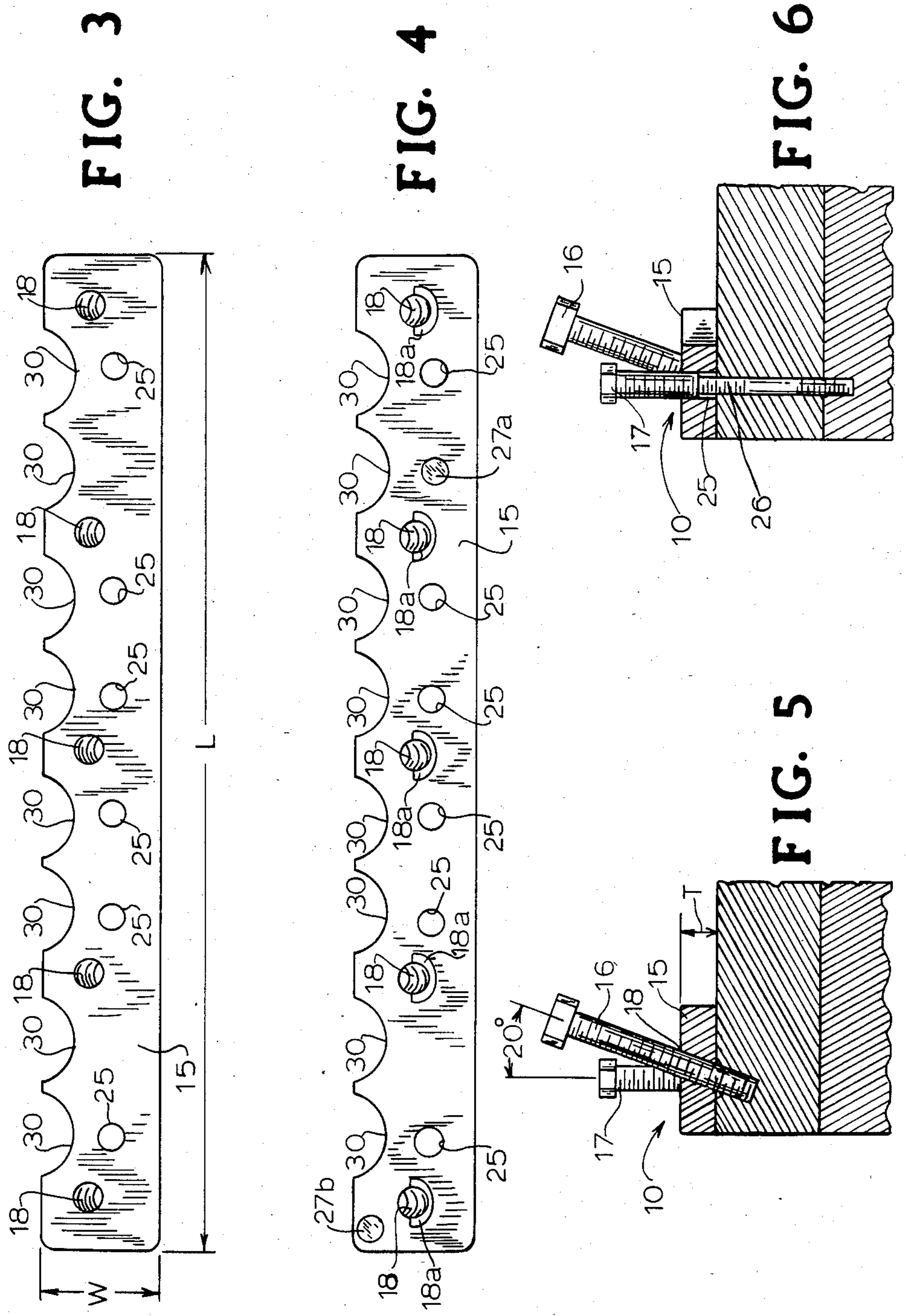
FIG. 3 is a top plan view of the elongated bar tool of the invention without its associated bolts used to remove the cylinder head.
FIG. 4 is a bottom view of the FIG. 3 bar tool.
FIG. 5 is a fragmentary section view taken along and in the direction of line 5—5 of FIG. 2 showing the bar tool mounted in place on a Fiat cylinder head prior to the head being removed from the engine block.
FIG. 6 is a fragmentary section view similar to FIG. 5 but taken along the line 6—6 of FIG. 2.

With reference to the drawings, the cylinder head removal tool of the present invention is generally designated 10. Cylinder head removal tool 10 made of tool steel comprises an elongated, flat, smooth bottomed surface bar tool 15, locking bolts 16 and pusher bolts 17. Bar tool 15 has a first series of angled threaded holes 18 passing through bar tool 15. The locations of holes 18 match the locations of angled threaded holes 19 in cylinder head 10 which are normally used to secure the camshaft housing to cylinder head 20. The underside of bar tool 15, adjacent each threaded hole 18, is flared outward as at 18*a* to aid in the locating and securement of bar tool 15 to cylinder head 20. When in use, holes 18 are angled at approximately 20° off vertical (FIG. 5) to match the angled orientation of threaded holes 19 in cylinder head 20.

A second series of threaded, vertical holes 25 pass through bar tool 15 at locations matching the locations of studs 26 in the engine block and which pass through cylinder head 20. Cutouts 30 in bar tool 15 are provided and located to allow bar tool 15 to be positioned adjacent the valve springs (not shown).

The length of bar tool 15 is substantially equal to the length of the cylinder head 20. The width of bar tool 15 is sufficient to provide a bearing surface of surrounding studs 26 when in use. The thickness of bar tool 15 is sufficient both for strength and for providing sufficient depth in holes 25 for receiving the threaded ends of studs 26 while still allowing enough depth for the pusher bolts 17 to engage the threads in holes 25. As previously mentioned and as best illustrated in FIG. 6, the inside diameter of threaded holes 25 is sufficient to allow the exposed threaded ends of studs 26 to loosely fit therein before being engaged by the pusher bolts 17. In one embodiment bar tool 15 was made of tool steel and had a length L of 19 inches, a width W of 2 inches and a thickness T of 9/16 inches.

When bar tool 15 is used for the purpose of removing a cylinder head 20 from the engine block of a Fiat automobile engine, the camshaft housing (not shown) is first removed from the cylinder head 20 by removing bolts which hold the camshaft housing on the cylinder head 20. The bolts which are normally easy to remove and which secure the cylinder head 20 to the engine block on the front side of the engine are next removed. The nuts on the studs 26 which secure the cylinder head 20 to the engine block on the back side of the engine are next removed which exposes the upper threaded ends of the studs for placement in holes 25. Next, bar tool 15 is placed on cylinder head 20 in the manner illustrated in FIG. 2 with the cutouts 30 positioned as illustrated. In such position threaded holes 18 in bar tool 15 are aligned with cylinder head holes 19 and bar tool holes 25 are aligned with studs 26. The exposed threaded ends of studs 26 reside loosely within holes 25. Locking bolts 16 are now threaded into bar tool holes 18 and into holes 19 in cylinder head 20. Thus, bar tool 15 is held fixedly secured to cylinder head 20 by locking bolts 16. Recesses ***27a*, *27b* on the bottom of bar tool 15 receive pins *28a*, *28b***.

Pusher bolts 17 are next screwed into holes 25 and are screwed down until the ends of pusher bolts 17 firmly contact the top face of studs 26. Here it should again be recognized that the inside diameters of the threaded holes 25 are larger than the outside threaded diameters on the exposed ends of the studs which allows each bolt 17 to be tightened in its respective threaded hole 25 while allowing bar tool 15 to gradually move up and off the upper threaded ends of the studs 26. Pusher bolts 17 are gradually tightened down until studs 26 are unfrozen and cylinder head 20 begins to be forced upward on studs 26. By slowly alternating the loosening and tightening of different pusher bolts 17 in some appropriate pattern developed by experience cylinder head 20 is ultimately freed and raised without binding upon any of studs 26.

Once free, cylinder head 20 is lifted off of the engine block by grasping the locking bolts 16 and lifting cylinder head 20. A heretofore troublesome and sometimes virtually impossible task is thus accomplished easily with the use of applicant's new cylinder head removal tool 10.

What is claimed is:

1. A tool for removing the cylinder head from the engine block of an engine of the Fiat model type 128, 1300, 1500, or X-1.9, said cylinder head mounting a series of upstanding valve springs and having a series of off-vertical threaded holes normally used for securing a camshaft housing and being released from securement to said block on one side by removal of a plurality of bolts and on an opposite side being secured to said block by a plurality of studs having their securing nuts removed and exposed threaded ends extending from the block above a flat bearing surface on the block with the shanks of the studs frozen in the cylinder head, comprising:

(a) an elongated bar having:
  (i) a flat, smooth, bottom bearing surface;
  (ii) a length substantially equal to the length of the cylinder head being removed;
  (iii) a thickness in excess of the length of the exposed threaded ends of the studs securing the cylinder head to the engine block;
  (iv) a width sufficient to provide a bearing surface surrounding each said exposed stud end when said bar is mounted on said cylinder head;
  (v) a first series of threaded holes located on said bar in off-vertical relation to the plane of the bottom surface of said bar to mate said off-vertical series of threaded holes in said cylinder head normally used to secure said camshaft housing thereon;
  (vi) a second series of threaded holes located on said bar in vertical relation to the plane of the bottom surface of said bar, said second series of threaded holes located on said bar being alignable with and adapted for loosely receiving the exposed threaded ends of said plurality of studs securing the cylinder head to the engine block; and
  (vii) a series of arc-shaped cutouts along one side of said bar adapted to fit adjacent valve springs on said cylinder head;
(b) a first set of bolts threadably received by said first series of off-vertical threaded holes in said bar and screwed into said series of off-vertical threaded holes in said cylinder head to fixedly secure said bar to said cylinder head; and
(c) a second set of bolts threadably received by said second series of threaded holes in said bar and adapted to be screwed down onto the top faces of the exposed threaded ends of said studs so as to gradually force said cylinder head upward and free of the shanks of said studs as said second set of bolts are tightened down onto the said top faces of said exposed threaded ends of said studs.

* * * * *